United States Patent [19]

Dykes et al.

[11] Patent Number: 5,428,671
[45] Date of Patent: Jun. 27, 1995

[54] MODEM FOR TIGHT COUPLING BETWEEN A COMPUTER AND A CELLULAR TELEPHONE

[75] Inventors: Don A. Dykes, Houston; Robin T. Castell, Spring; Andrew C. Clark, Houston; Paul E. Nagel, The Woodlands; Huyen B. Tran, Houston; Randall L. Jones, Plano; Ronald L. Baldridge, Carrollton, all of Tex.

[73] Assignee: Compaq Computer Corporation, Houston, Tex.

[21] Appl. No.: 973,625

[22] Filed: Nov. 9, 1992

[51] Int. Cl.[6] .......................................... H04M 11/00
[52] U.S. Cl. ........................................ 379/93; 379/97; 379/58; 379/59; 379/355
[58] Field of Search ...................... 379/93, 96, 97, 98, 379/58, 59, 60, 61, 62, 63, 355; 375/8, 121, 9

[56] References Cited

U.S. PATENT DOCUMENTS

| Re. 34,034 | 8/1992 | O'Sullivan | 379/59 |
|---|---|---|---|
| 4,012,596 | 3/1977 | West, Jr. et al. | 179/41 A |
| 4,568,800 | 2/1986 | Orikasa | 179/2 EB |
| 4,658,096 | 4/1987 | West, Jr. et al. | 379/59 |
| 4,680,787 | 7/1987 | Marry | 379/63 |
| 4,697,281 | 9/1987 | O'Sullivan | 379/59 |
| 4,718,080 | 1/1988 | Serrano et al. | 379/59 |
| 4,737,975 | 4/1988 | Shafer | 379/58 |
| 4,752,949 | 6/1988 | Steinbeck et al. | 379/59 |
| 4,759,059 | 7/1988 | Christensen | 379/161 |
| 4,775,997 | 10/1988 | West, Jr. et al. | 379/58 |
| 4,837,800 | 6/1989 | Freeburg et al. | 379/59 |
| 4,837,812 | 6/1989 | Takahashi et al. | 379/98 |
| 4,852,146 | 7/1989 | Hathcock et al. | 379/58 |
| 4,868,863 | 9/1989 | Hartley et al. | 379/98 |
| 4,887,290 | 12/1989 | Dop et al. | 379/33 |
| 4,890,315 | 12/1989 | Bendixen et al. | 379/59 |
| 4,912,756 | 3/1990 | Hop | 379/60 |
| 4,972,457 | 11/1990 | O'Sullivan | 379/59 |
| 4,980,910 | 12/1990 | Oba et al. | 379/354 |
| 4,991,197 | 2/1991 | Morris | 379/58 |
| 5,127,041 | 6/1992 | O'Sullivan | 379/63 |
| 5,131,019 | 7/1992 | Sheffer et al. | 379/39 |
| 5,134,648 | 7/1992 | Hochfield et al. | 379/98 |
| 5,249,218 | 9/1993 | Sainton | 379/93 |

FOREIGN PATENT DOCUMENTS

| 459279 | 5/1991 | European Pat. Off. | 379/58 |
|---|---|---|---|
| 504007 | 9/1992 | European Pat. Off. | |
| WO92/10047 | 6/1992 | Finland | 379/58 |
| 2170977 | 8/1986 | United Kingdom | 379/59 |
| WO8905553 | 6/1989 | WIPO | 379/58 |
| WO91/07044 | 5/1991 | WIPO | 379/58 |

OTHER PUBLICATIONS

Installation and User Instructions for *THE Portable Cellular Connection* TM, Motorola, Inc. (1992).
The Go Anywhere Phone, Motorola, Inc. (1987).
CP 3000, Uniden Corporation of America (1988).
CDL 410 Features, OKI Telecom (Sep. 1986).
"Features and Benefits," Motorola, Inc. (1988).

(List continued on next page.)

*Primary Examiner*—Curtis Kuntz
*Assistant Examiner*—Jason Chan
*Attorney, Agent, or Firm*—Pravel, Hewitt, Kimball & Krieger

[57] ABSTRACT

A modem which includes connections for both land lines and a cellular phone. The modem contains high and low level routines that allow it to perform standard AT commands rationally when connected to a cellular phone, and further perform additional AT commands that access cellular specific features. An applications software program in a computer connected to the modem can provide a number of options for determining whether to use the land line or the cellular phone when both are connected. First, it can default to the land line and only use the cellular phone if the land line is not available. Alternatively, it can first use the cellular phone and only use the land line if the cellular phone signal strength is not sufficient. Further, cellular file transfer operations can be aborted if the remaining battery life in the cellular phone is insufficient to reliably complete the transfer.

19 Claims, 7 Drawing Sheets

OTHER PUBLICATIONS

Spectrum Cellular and Dacom Systems Sign Bridge Manufacturing and Distribution Agreement for United Kingdom, Press Release dated Jan. 3, 1988, Spectrum Cellular Corporation.

Spectrum Cellular Launches Portable Office with the Introduction of its LapPak Cellular Workstation, Press Release, Feb. 8, 1989, Spectrum Cellular Corporation.

Spectrum and Telular Jointly Announce Signing of Two Contracts and Agree to Collaborate on New Products, Press Release, Dec. 6, 1988, Spectrum Cellular Corporation.

Spectrum Cellular Announces Expanded Product Line Offering Additional Compatibility for its Bridge Cellualr Modem, Press Release, Dec. 13, 1988, Spectrum Cellular Corporation.

Case Histories in Cellular Data Communications, Spectrum Cellular 1988.

Peter Shikli, *Solving Data Communications Problems with the Cellular Network*, PICO Jan. 1988, pp. 14–17.

HazCom One TM, Spectrum Cellular.

Stockholder Relations, Spectrum Cellular.

Ameritech Mobile Communications Announces Mobil Access Data Service Utilizing Spectrum's Bridge and Span Cellular Modems, Press Release, Feb. 17, 1987, Spectrum Cellular.

Spectrum Cellular and Omnitel Announce Joint Development of First Internal Laptop Cellular Modem, Press Release, Aug. 24, 1987, Spectrum Cellular.

Tom Steinert-Threlkeld, *Ringing a new era for pay phones*, The Dallas Morning News.

Robert C. Adair, *Cellular & Data: Coming on Strong*, Cellular Business Jul. 1987, pp. 34–35.

Spectrum Cellular: The First Name in Cellular Data Communication, The Only Name You Need to Know. Selling Cellular Data Communications Applications, Spectrum Cellular Corporation.

Compaq Apache Modem Board Level Design Specification, p. 12.

*Toshiba Modem Boasts Wireless Transmission*, Jun. 18, 1990.

*Networking*, Infoworld, Feb. 19, 1990 pp. 31, 39.

Press Kit, Intelligence Technology Corporation, Nov. 12, 1990.

*Hardware*, Infoworld, Feb. 12, 1990, p. 23.

*GRiD PowerTek Debut Cellular/Laptop Combination*, Feb. 26, 1990, p. 19.

GRiD Portable Cellular Workstation Technical Specifications, PowerTek Industries, Inc.

Toshiba Modems, May 1990, Toshiba America Information Systems, Inc.

The Cellular Handbook, Microcom, Inc. 1990.

MNP Cellular Modems, Microcom Systems, Inc. 1990.

Microcom Announces New Cellular Family, Press Release, Jun. 26, 1990, Microcom.

Michael R. Zimmerman, *Microcom Unveils Cellular Modems for Laptop Users*, PC Week, Jun. 25, 1990.

Microcom Networking Protocol (MNP), A Brief Technical Overview, Microcom, Inc. 1990.

Celjack TM Technical Specification, Telular, Inc., 1989.

Compaq Mozart Modem Specification Rev. CX, pp. 15, 61.

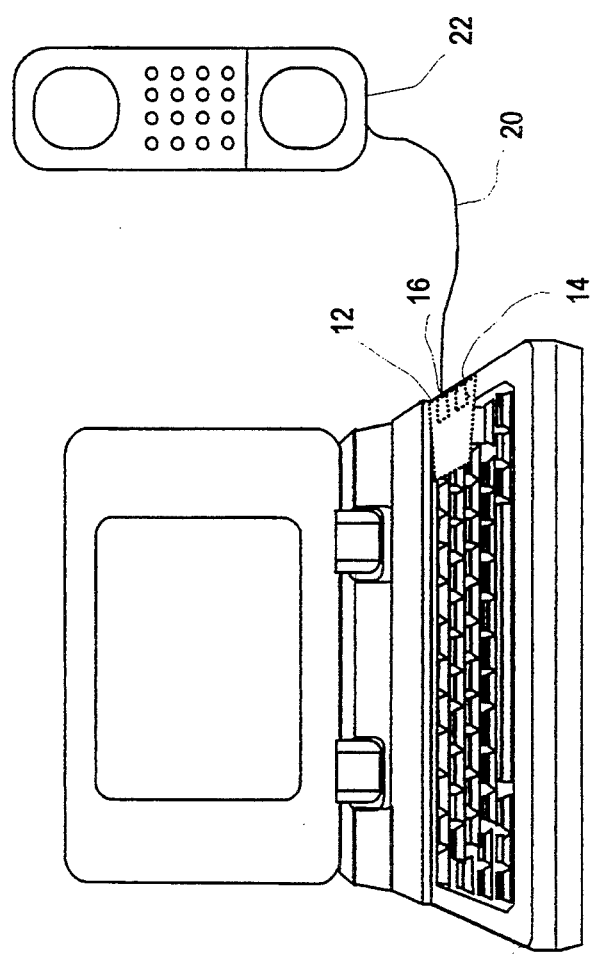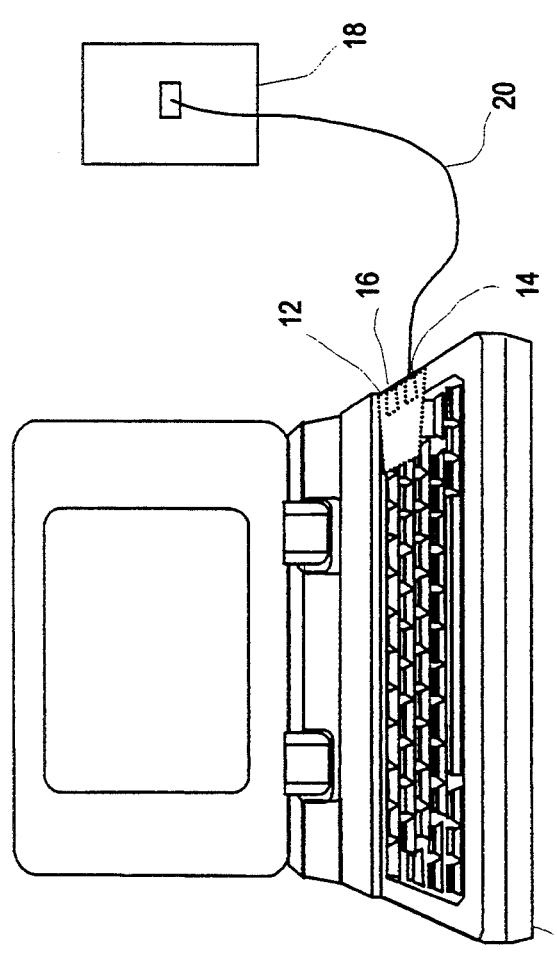

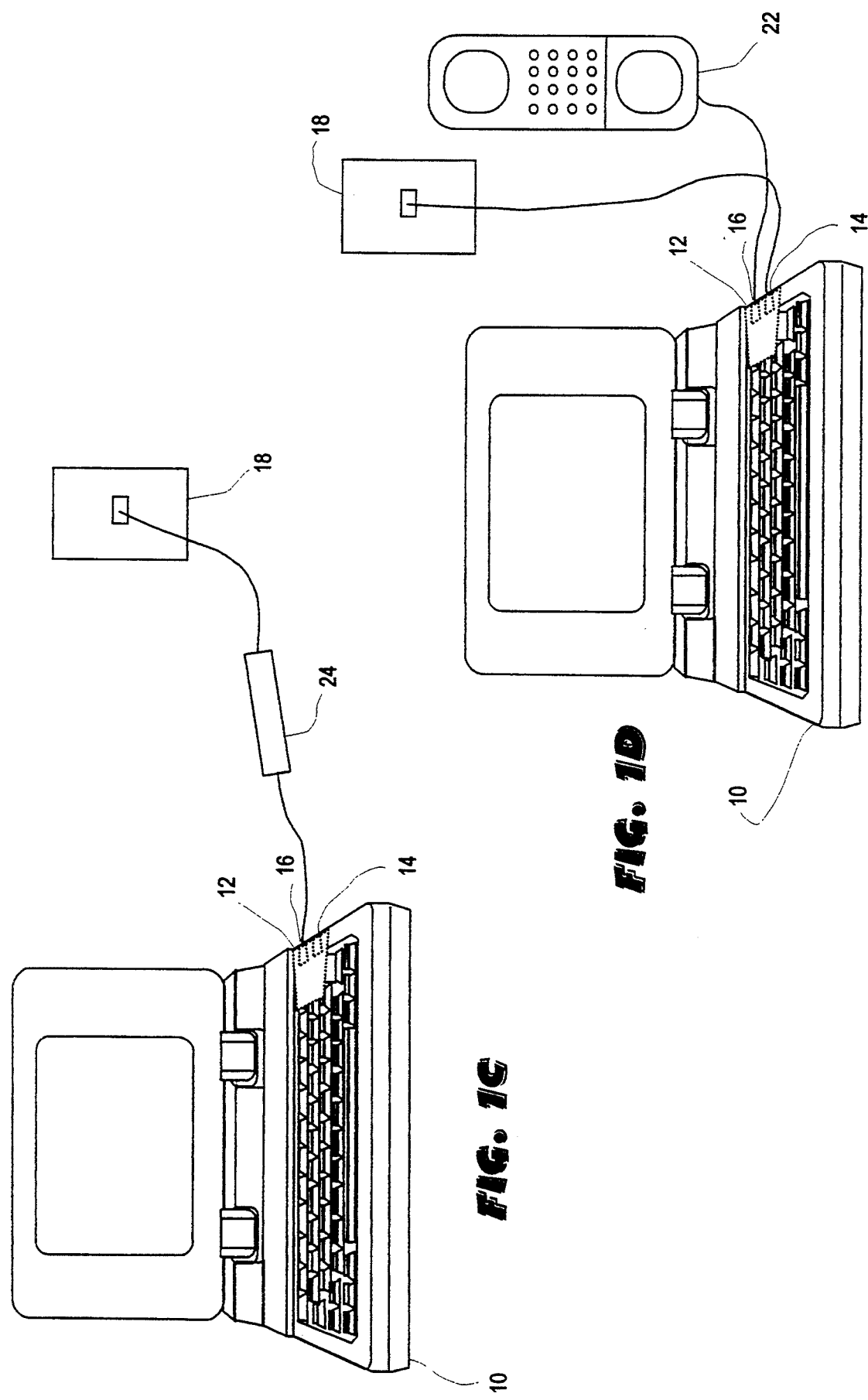

MODEM FOR TIGHT COUPLING BETWEEN A COMPUTER AND A CELLULAR TELEPHONE

BACKGROUND OF THE INVENTION

1. Field of the Invention

This invention relates to a modem designed to connect a computer with a cellular telephone. More specifically, it relates to a modem with firmware and hardware designed to provide a tightly integrated coupling of functions between the computer and the cellular telephone, such that the computer can control features of the cellular telephone and inquire about cellular telephone conditions, and can respond accordingly.

2. Description of the Related Art

In the year 1948, a simple device was invented that was to have a profound impact on modern life. That device was the electronic transistor. It was the transistor that first made computers technically practical. These first computers were behemoths—centralized machines servicing a large number of users and a large number of tasks. While the economic impact of these mainframe systems was tremendous, it was not until the subsequent development of the microprocessor, and the attendant development of the personal computer, that computer technology directly impacted the lives of the modern consumer and small businessman.

When the personal computer market exploded in the 1980's, it filled needs very different from those filled by the mainframe computer. Personal computers were used to perform individual, isolated tasks without communication with other computers except perhaps through manual exchange of floppy disks. The mainframe computer still served the requirements of centralized data access and coordination among a large number of users.

But as the personal computer market developed, the advantages and possibilities of communicating among these machines became apparent. One of the methods of communication that rose to the forefront was modem technology. By connecting modems to their personal computers, users could directly transfer data between and communicate in realtime with mainframes and other personal computers. For example, bulletin board systems have now become very popular, allowing a large number of users to remotely upload and download free software, exchange information, and engage in online forums. With modems' rising speeds, increased standardization, and expanding uses, one is now hard pressed to find a personal computer system that does not use a modem.

While intercommunication between personal computers and mainframes was on the rise, another development was to have an impact on the need for communicating with distant systems. Personal computers were becoming smaller. From the original large under-the-desk machines, desktop machines evolved, then transportables, and finally laptop and notebook computers. These laptops and notebooks are typically very mobile, easily traveling from city to city, state to state, and even country to country. But the advantage of portability itself presents a problem: while stationary machines can be conveniently connected to communication networks via a telephone line, laptop users might wish to establish communication links from countries with which their laptop's modems are not compatible, or they might wish to communicate where normal phone connections are not available, such as from a car, bus, or train.

Although standardized within a single country, telephone systems around the world are generally nonstandard, and different hardware is required to connect to these various systems. Thus, a modem configured to connect to one country's phone system would generally not be suitable for connection to another's. The physical connection to a particular national phone system is made through what is known as a data access arrangement, or DAA. Each particular phone system will have its own associated DAA. Typically, modems are constructed with a DAA built in. That, however, means that a modem suitable for one country would not be able to connect to another country's phone system, or would at least require an external DAA.

With portable, laptop, and notebook computers, the problem of the different DAA's required for each country becomes even more apparent. One would not wish to buy a notebook or laptop with a built-in modem that could not be easily modified for use in another country. An international traveler might never be sure to which country's phone system he would primarily wish to connect. For example, if he lived in the U.S., he would want his laptop's modem to be suitable for directly connecting to the U.S.' phone system. But if he moved to Germany, he would wish his laptop's modem to be suitable for directly connecting to the German phone system. But further, if our hypothetical businessman, living in the U.S., traveled to Germany, he would want to be able to connect his laptop into the German phone system even though his laptop's modem is internally configured for connection to the U.S. phone system. To this end, external DAA's have been used, with one phone system handled by default and others handled by the appropriate external DAA.

For a computer user in a car, bus, or train, another recent technological development provides possibilities for laptop and notebook modem communications. With the recent expansion of cellular telephone systems, a cellular telephone has become a very common, and very portable, item. Not surprisingly, crude attempts at a marriage between cellular telephone technology and modem technology have been made using laptop and notebook computers and cellular phones. By connecting a laptop to a cellular phone, one can access a telephone network in generally the same way as by directly hooking to a telephone wall outlet, or via a "land line."

Using a cellular phone for establishing a modem communications link does present attendant problems, however. Certain standards have evolved for communications between a computer and its attached modem. These physical links are generally made through a serial or parallel communications port or through the host computer bus, and logically certain commands are sent to the modem, which returns certain responses. The de facto standard for these commands is the Hayes Microcomputer Products "AT" command set. This command set is well known in the art, and includes such commands as the ATDTn command, which instructs the modem to dial the number "n" and the ATH command which instructs the modem to hang up the telephone. Unfortunately, these commands were designed with land line connections in mind, and certain aspects of cellular telephone systems do not lend themselves toward activation or use through these AT commands. For example, commands such as "take the phone off the hook" make little sense in the cellular world, as the cellular phone is either attempting to access its network or it is not-it does not go "off hook" before it does. Thus, the standardized AT command set is not always a perfect fit with cellular phones, and laptop software that uses the AT command set will not necessarily receive expected results from attempting certain commands. Previous attempts at combining a cellular phone with a modem have required the use of special command sequences, so that it was difficult to switch back and forth between the cellular phone and a land line. Such special sequences also led to problems in achieving seamless integration of high level applications. For example, a user's computerized phone directory would often require complete reentry to place the needed special command sequences within the numbers to be dialed.

It would be desirable to use a conventional land line command set, such as the AT commands, in a way such that it was performed consistently whether a cellular telephone network or a land line system was used. It would also be desirable to provide access to various features of cellular phones not generally available in a land line.

SUMMARY OF THE INVENTION

A modem constructed according to the invention includes connections for both land lines and a cellular phone. Communication software in the host computer sends normal AT command codes to the modem, which then selectively performs low level primitives, selected according to whether a communications link is to be established or has been established through a land line or through a cellular phone.

In a modem built according to the invention, the modem firmware provides a seamless control link between the host computer and the cellular phone. Specifically, AT commands normally sent to the modem for controlling land lines behave predictably when the modem is instead controlling the cellular phone.

An example of an AT command which is more suited towards land lines, but behaves rationally in the modem constructed according to the invention, is the AT dial command, or ATDT. In a modem according to the invention, when the computer applications software sends a dial command to the modem, and the modem determines that a cellular phone is connected, the modem first directs the cellular phone to receive the numbers specified by the dial command up to the first delaying dial modifier character or the end of the string. The modem according to the invention instructs the cellular phone to store these numbers by sending commands to the cellular phone through the cellular phone's communication bus, as opposed to sending an analog signal to the cellular phone via the modem's data pump. After the number to be dialed has been transmitted to the cellular phone through its communications bus, the modem then sends a SEND command to the cellular phone on that same communications bus. This instructs the cellular phone to dial the previously entered number. After dialing that number, if the cellular phone is capable of generating its own DTMF codes and can be directed to generate those codes through its cellular communications bus, the modem directs the cellular phone by commands over the cellular communications bus to generate the DTMF tones and appropriate pauses that correspond to the numbers including and following the first delaying dial modifier character.

If, however, the cellular phone is not capable of being directed to generate DTMF tones, the modem generates DTMF tones in its internal data pump and transmits those tones over the audio path to the cellular phone to perform additional functions after the connection to the called number is made.

Other standard AT commands also behave predictably when used with a cellular phone attached to a modem constructed according to the invention. For example, the ATA (answer) and ATH (hang up) commands both behave predictably, even though land line operations do not readily translate to the cellular phone model.

Further, the AT command set of a modem constructed according to the invention is extended to provide control of cellular specific features that would be useful to the host computer and to provide access to cellular information. For example, the modem includes AT commands that return the manufacturer and phone number of the cellular phone, that enable and disable the cellular phone keypad, that lock and unlock the cellular phone, that sets the cellular NAM (numeric address module), that log time used by the cellular phone, that reset the cellular timers, that store and retrieve phone numbers stored in the cellular phone, that display data on the cellular phone display, that determine the cellular battery strength, that return the status of certain cellular phone features (i.e., roam, in use, call forwarding, locked, system type), that select the appropriate cellular system, that return the signal strength and set the signal strength threshold, that set the cellular automatic shutoff time, and that permit setting of the speaker and ringer volumes. Further, an AT command is included that permits the host computer to specify the model of cellular phone that would be connected to the modem constructed according to the invention.

In a modem built according to the invention, applications software in the computer performs a special sequence when it is desired to transfer a file over the cellular phone. First, the high level computer queries the modem through AT commands to determine the strength of the cellular battery. The modem determines the cellular battery strength by communicating over the cellular phone's communications bus, and the modem then returns the results of these inquiries as a response to the AT command requesting the battery strength. The computer application software determines, considering the current bits per second rate and the length of the file to be transferred, whether the cellular battery is too weak to complete the file transfer. If the battery is strong enough, the file is transferred normally, with the computer sending the file to the modem, which sends the data to the cellular phone. If the battery is too weak, the high level application software determines if the battery is strong enough to send file if the file is first compressed. If the battery is still too weak, an ERROR is returned to the user. Otherwise the file is compressed and transmitted.

Further applications software in the computer connected to the device according to the invention first attempts to establish a connection via a land line connected to the modem. If that land line is not working properly, or the connection cannot otherwise be made, then the applications software then instructs the modem to initiate the connection through an attached cellular phone.

Application software in the computer connected to the device according to the invention can also first attempt to establish a connection via the cellular phone, and if the cellular phone signal strength is insufficient, disconnecting the cellular phone connection and establishing a connection over the land line.

BRIEF DESCRIPTION OF THE DRAWINGS

A better understanding of the present invention can be obtained when the following detailed description of the preferred embodiment is considered in conjunction with the following drawings, in which:

FIGS. 1A-D show a laptop computer with a modem according to the invention connected for operation in various configurations.

DETAILED DESCRIPTION OF THE PREFERRED EMBODIMENT

Figure 2:
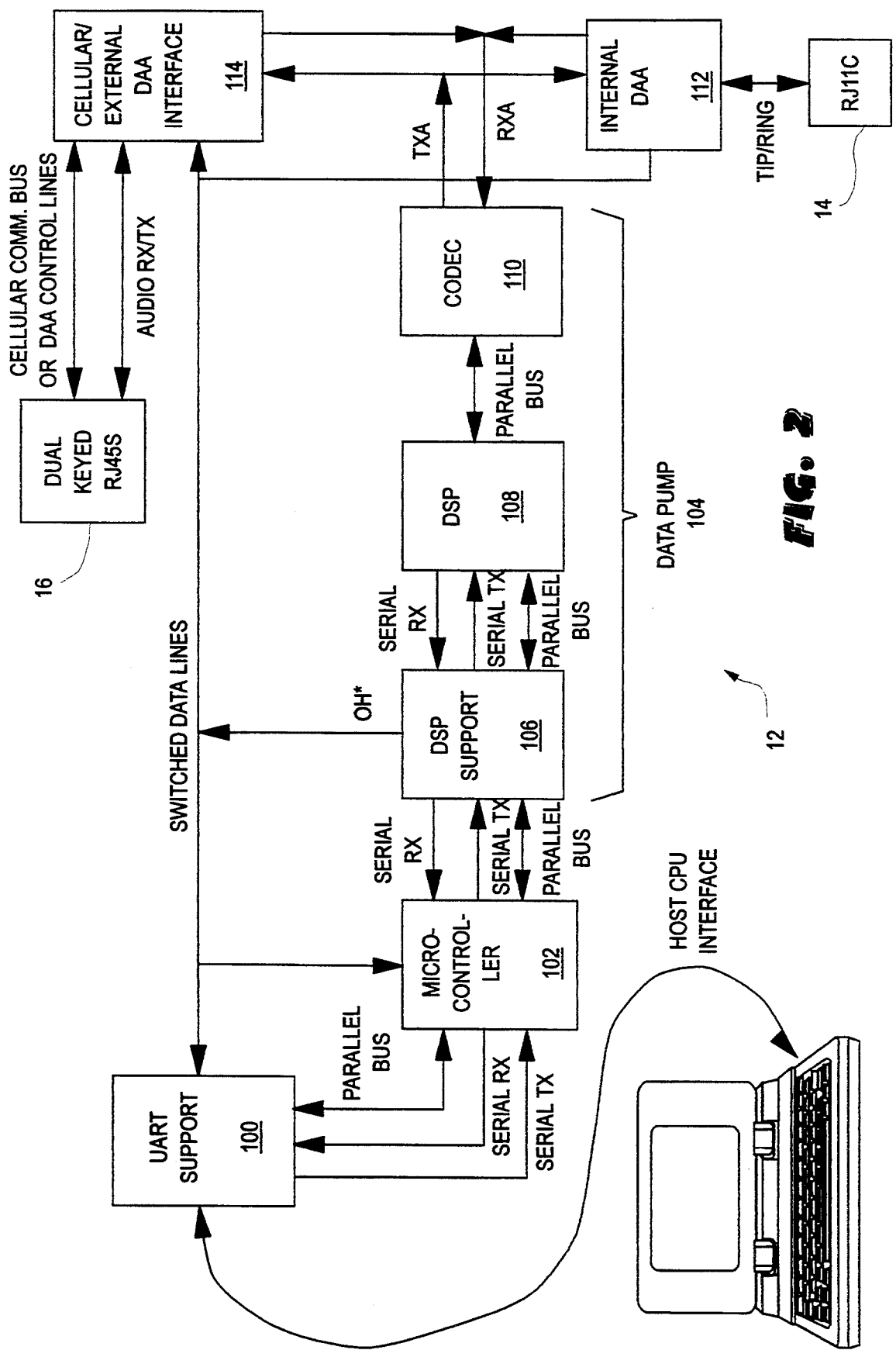
FIG. 2 shows a block diagram of the hardware in a modem designed to perform the methods according to the invention.

Turning now to the drawings, FIGS. 1A-D show a laptop computer 10 with a modem 12 constructed according to the invention connected for operation in a variety of configurations. The modem 12 is integrated into the laptop computer 10, and the modem 12 has two external jacks for connection to a variety of devices. The first of these jacks is an RJ11 type jack 14, and the second is an RJ45 type jack 16. Of course, these physical jacks are exemplary only, and other types of jacks could be used. Further, the modem 12 is preferably, but not necessarily, integrated into the laptop computer 10, and the laptop computer 10 could be a type of computer other than a laptop. For example, a desktop system would also benefit from being connected to the modem 12 constructed according to the invention.

In FIG. 1A, the laptop computer 10 and the modem 12 are connected by way of the RJ11 type jack 14 and a cable 20 to a telephone wall outlet 18, as one would find in any typical home. The RJ45 type jack 16 is left unconnected. This configuration is analogous to a computer with an integrated modem connected to a telephone wall outlet.

FIG. 1B again shows the laptop computer 10, but in this configuration the modem 12 is connected to a cellular phone 22 via the RJ45 type jack 16 by an interface cable 20. In this configuration, the RJ11 type jack 14 is left unconnected. The cellular phone 22 may have, for example, a DTMF generator 21, a cellular keypad 23, cellular timers 25, memory 27, a display 29, and a battery 31. Some cellular phones have these features, while others do not, but they are well known to those skilled in the art of cellular phone manufacture. The DTMF generator 21, the cellular keypad 23, the timers 25, memory 27, and the display 29 are all typically internally controlled by circuitry in a cellular phone.

FIG. 1C shows the laptop computer 10 and modem 12 configured for operation in a foreign country. In FIG. 1C, the laptop computer 10 is connected via the RJ45 type jack 16 to a telephone wall outlet 18, but in this configuration an external DAA 24 provides the circuitry necessary to adapt to the foreign telephone system. An advantage of the modem 12 constructed according to the invention is that it can be easily modified to change its internal, "native" country. That is, the external DAA 24 is only needed if the modem 12 has not been configured internally for the country to which one is attempting to connect the laptop computer 10. Thus, if the modem 12 is internally configured for the U.S. telephone system, if one is in the U.S., one need only connect the system as shown in FIG. 1A in order to communicate with the telephone system. Only if one goes to another country, say Germany, would one need the external DAA 24 as shown in FIG. 1C.

But if the user then moves to Germany, that user could easily have the modem 12 modified such that the German telephone system becomes its "native" phone system. This would be done by a technician simply switching out an internal DAA, which will be described later. Then, while in Germany, the user configures the laptop computer 10 as shown in FIG. 1A for communications with the German telephone system. When the user visits the U.S., the user would then use the external DAA 24, which is then specifically designed for the U.S.

FIG. 1D shows a further possible configuration of the laptop computer 10 with the modem 12 constructed according to the invention. In FIG. 1D, the laptop computer 10 is connected to both the cellular phone 22 and the telephone wall outlet 18, which is here a telephone jack for the native telephone system of the modem 12. In this configuration, the laptop computer 10 is connected to the cellular phone 22 via the RJ45 type jack 16 and is connected to the native phone system via the RJ11 type jack 14 and the telephone wall outlet 18. As will be seen, an advantage of the modem 12 constructed according to the invention is that it can internally switch between communications with the cellular phone 22 and the telephone wall outlet 18.

Logical Blocks of the Modem 12

FIG. 2 shows a logical block diagram of the various elements of the modem 12 constructed according to the invention. The laptop computer 10 physically contains the modem 12 and connects via an internal connector to a UART/support chip 100. The UART/support chip 100 typically connects to the host bus of the laptop computer 10, for example an EISA or ISA bus, although it could be any type of typical communications bus. The UART/support chip 100 then appears as a universal asynchronous receiver transmitter (UART) to the laptop computer 10. The UART/support chip 100 connects to, among other things, a microcontroller 102 by both serial and parallel buses. The UART/support chip 100 provides a variety of functions to the modem 12, including communications to the laptop computer 10, clock controls, configurable registers, and power down control for the microcontroller 102. The UART/support chip 100 is typically an application specific integrated circuit, but could instead be constructed of discrete components.

The microcontroller 102 is typically an embedded controller, and in the preferred embodiment is a 68302 integrated multiprotocol processor, manufactured by Motorola Incorporated. The microcontroller 102 communicates with a data pump 104 by both serial and parallel buses. The data pump 104 is typically a modem data pump chip set supporting the various protocols of modem communication, including V.32bis protocol and fax protocols. In the preferred embodiment, the data pump 104 is a WE ® DSP16A-V32FB-LT V.32bis plus FAX Data Pump Chip Set, sold by AT&T Microelectronics. This chip set includes a digital signal processor (DSP) support chip 106, a DSP 108, and a coder-decoder (CODEC) 110. This chip set is interconnected according to AT&T specifications and provides the typical data pump features of control, analog-digital and digital-analog conversion, digital signal processing, and interfacing.

The microcontroller 102 communicates with the data pump 104 by both serial and parallel buses. The serial bus is used to transmit and receive data that will become the transmitted and received modem data, while the parallel bus is used to control and configure various features within the data pump 104. These features are controlled through the DSP support chip 106. The data pump 104 converts the digital serial data provided by the microcontroller 102 into the appropriate analog format. This is typically done by the DSP 108, which then transmits and receives the data via the CODEC 110.

The CODEC 110 connects to the actual external lines through analog transmit and receive signals, TXA and RXA. These signals are selectively connected to either an internal DAA 112 or a cellular/external DAA interface 114. The internal DAA is then connected to a normal telephone line by the RJ11 type jack 14, while the cellular/external DAA interface 114 can be connected through the RJ45 type jack 16 to the external DAA 24 or the cellular phone 22. When connected to the cellular phone 22, a number of data lines from the microcontroller 102 and UART/support chip 100 form a cellular communications bus, which is a serial, digital bus that varies for each make of cellular phone 22.

Various signals are typically used to interface with telephone lines, including the ring indicator signal RI* and the off hook control signal OH*. A DAA generates and receives these signals, as well as the TXA and RXA signals, and converts them into a format suitable for that particular country's two-wire telephone system, or whatever type of telephone system to which the DAA is connected. Various digital lines, including RI*, OH*, a clock line CLK*, and a data line DTA, form a set of switched data lines between the cellular/external DAA interface 114, the UART/support chip 100, the microcontroller 102, and the internal DAA 112. In this embodiment, the OH* signal line is physically driven by the DSP support chip 106. These lines, as well as the TXA and RXA lines, can be switched by the microcontroller 102 to connect either the cellular/external DAA interface 114 or the internal DAA 112.

In operation, the modem 12 according to the invention and as logically shown in FIG. 2 is connected in one of the configurations shown in FIGS. 1A-D. Thus, the RJ45 type jack 16 is connected to either a cellular phone 22 or an external DAA 24, which would generally be a DAA constructed for operation in a country other than that of the internal DAA 112. The RJ11 type jack 14 is directly connected to the phone system of the native country of the modem 12, that native country being determined by the country with which the internal DAA 112 is compatible. The internal DAA 112 is typically a separate physical board inside the laptop computer 10 that is directly connected to the modem 12. If one desired to move to a different country having a different telephone system, one would simply have a technician replace the internal DAA 112 with that of the country in which the user would connect to the phone system. Both the RJ11 type jack 14 and the RJ45 type jack 16 are typically located on the main board of the modem 12. This alleviates the need for the internal DAA 112 to require a separate RJ11 type jack. For countries which cannot directly use the RJ11 type jack 14, an adaptor cable having an RJ11 plug and an appropriate country plug is utilized.

The microcontroller 102 determines what is externally connected to the jacks and selects whether to use the cellular/external DAA interface 114 or the internal DAA 112. The microcontroller 102 further selects whether to use the cellular/external DAA interface 114 in a cellular phone mode or an external DAA mode. This is all done via the switched data lines. Briefly, the cellular phone/external DAA interface 114 is first connected to the data pump 104, the microcontroller 102 and the UART/support logic 100. The switched data lines are operated to determine if a preselected cellular phone 20 is connected. If so, cellular phone operation is indicated. If not, the presence of a valid external DAA 24 is established using the switched data lines. If present, external DAA operation for a particular country is indicated. If not present, the presence of the internal DAA 112 is established using the switched data lines. If present, use of the internal DAA and a particular country is indicated. If not present, an error is provided.

The microcontroller 102 uses the parallel bus between it and the UART/support chip 100 to configure and determine the status of the UART/support chip 100. The laptop computer 10 sends and receives data to the modem 12 via the UART/support chip 100, which then serially communicates that data to the microcontroller 102. The microcontroller 102 then, after configuring the data pump 104 through the parallel bus between them, serially sends to the data pump 104 the data to be transmitted to the communications device. The data pump 104 then processes this serial digital data and converts into an analog form suitable for communication at the rate and in the protocol desired. It then transmits this information via the TXA signal to the device the microcontroller 102 has selected, the cellular/external DAA interface 114 or the internal DAA 112, which then communicates via the active jack. Similarly, received data is transmitted from the active jack through the cellular/external DAA interface 114 or the internal DAA 112 to the data pump 104, which subsequently transmits that data to the microcontroller 102, which then transmits the data to the laptop computer 10 by way of the UART/support chip 100. Of course, the microcontroller 102 may perform compression/decompression functions on the data going either direction, or otherwise "massage" the data.

Block Diagram of Modem Firmware AT Command Interpretation

Figure 3:
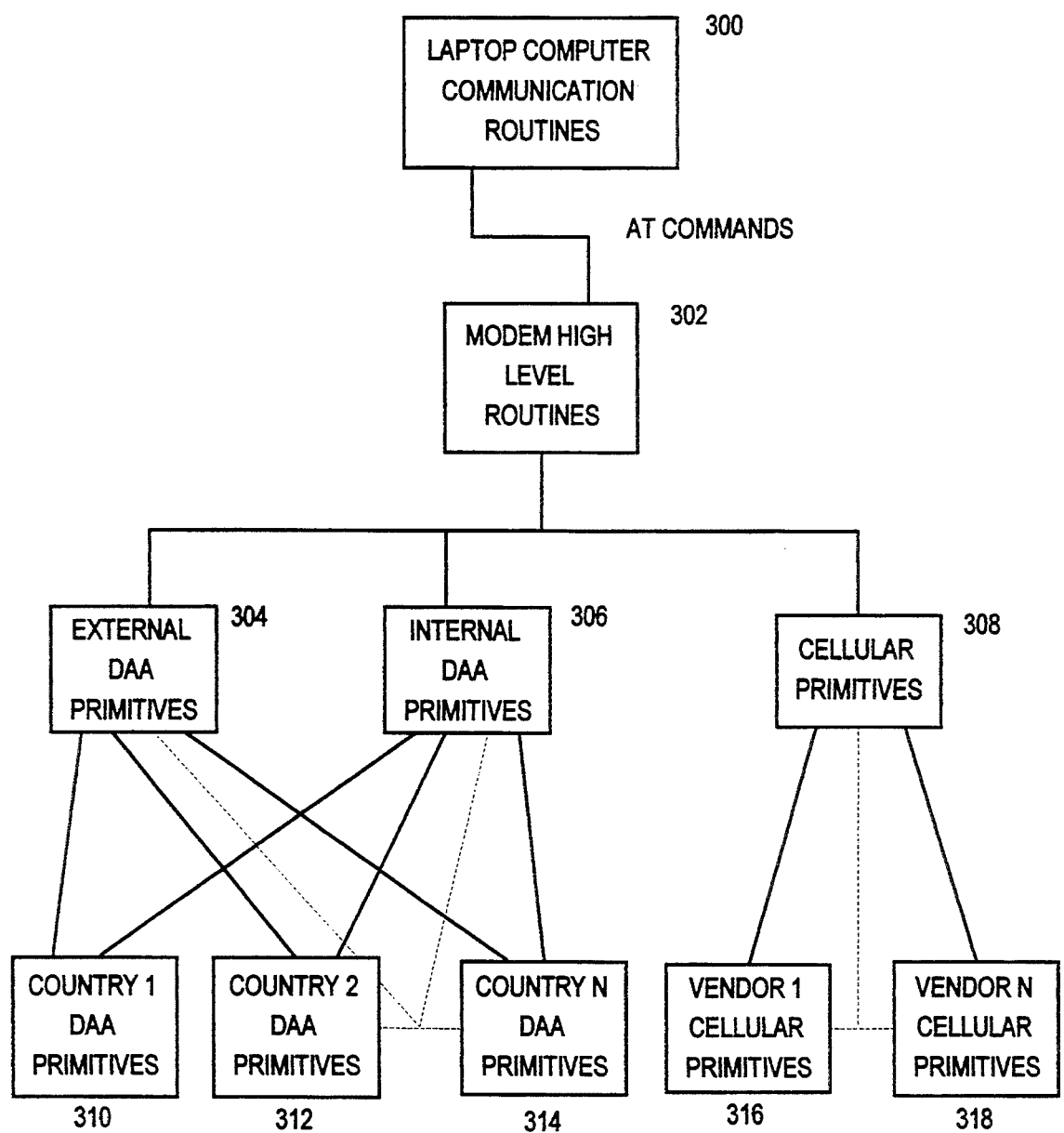
FIG. 3 shows a block diagram of the sequences used to control the modem of FIG. 2, those sequences designed to implement the methods according to the invention.

FIG. 3 shows a block diagram of the firmware contained in the modem 12 that executes on the microcontroller 102 to interpret and implement AT commands sent by the laptop computer 10. The laptop computer communication routines 300 represent high level communications routines contained in the laptop computer 10. These communications routines may be as simple as direct operating system communications primitives or as complex as a high level application software program that totally insulates from the user communications between the laptop computer 10 and the modem 12. In any case, these routines, typically through operating system primitives, communicate with the UART/support chip 100 on the modem 12, via the peripheral bus in the laptop computer 10 to which the modem 12 is connected. This bus connection is internal to the laptop computer 10, as the modem 12 is typically contained within the laptop computer 10. The laptop computer communications routines 300 send AT commands to the modem 12 and receive responses. These AT commands are sent to the modem high level routines 302, which send typical AT result codes back to the laptop computer communication routines 300.

Implementation of AT commands is well known in the art for normal land line modem communications links. However, some of these AT commands do not lend themselves to implementation with cellular phones. For example, to dial a number on a land line system, a modem need only take the phone off hook, send the DTMF (dual tone multi-frequency) codes or dial pulses needed to dial the number, and then wait. With a cellular phone, however, a modem must send commands on a separate communication bus, specifying the number one wishes to dial, and then send a command on that bus directing the cellular phone to dial the number previously sent. Thus, different low level routines are needed to implement the same high level AT commands depending on whether one wishes to execute those commands using a DAA connected to a land line or using a cellular phone.

The external DAA primitive routines 304 and internal DAA primitive routines 306 perform these various AT commands when the modem 12 communicates over land lines. The cellular primitive routines 308 are executed when the modem 12 is communicating over the cellular phone 22 and must direct the cellular phone 22 to perform the functions associated with each AT command. Of course, all of these routines overlap, but there are also distinct differences. There especially is overlap between the external DAA primitive routines 304 and the internal DAA primitive routines 306. They typically differ only in the ports to which the modem 12 connects, with the external DAA primitive routines 304 using the RJ45 type jack 16 and the internal DAA primitive routines 306 using the internal DAA 112 and thus the RJ11 type jack 14.

Beneath the external DAA primitive routines 304 and the internal DAA primitive routines 306, each country may have idiosyncrasies in how certain AT commands should be implemented. For example, some countries forbid the dialing of certain numbers, and lists are needed to maintain these numbers. DAA primitive routines 310, 312, and 314 are provided for each of the separate countries. Again, there is a great deal of overlap between the DAA primitive routines 310, 312, and 314 for the various countries, but there are also differences.

Beneath the cellular primitives 308, each cellular phone 22 to which the modem 12 is intended to be connected has different vendor cellular primitive routines 316 and 318. For example, some vendors' cellular phones can generate their own DTMF codes at the direction of the modem 12, while other vendors' cellular phones cannot. For the former, the microcontroller 102 sends commands via the cellular external/internal DAA interface 114 and the associated cellular communications bus through the RJ45 type jack 16. For the latter, the modem 12 must generate the DTMF tones in the data pump 104 and transmit them as analog signals over the TXA line. Further, certain commands and options are present in one vendor's cellular phone and other different commands and options may be present in another vendor's cellular phone. The vendor primitive routines 316 and 318 handle these differences and other differences between the various supported cellular phones.

To the laptop computer 10, the modem high level routines 302 insulate the laptop computer communication routines 300 from the external DAA primitive routines 304, the internal DAA primitive routines 306, and the cellular primitive routines 308. The modem high level routines 302 accept the same AT commands and leave the idiosyncratic device dependent implementation to the external DAA primitive routines 304, the internal DAA primitive routines 306, and the cellular primitive routines 308. Thus, one need not modify the laptop computer 10 software for applications to take advantage of communications over a cellular phone link, as that link appears as would a normal land line link accessed through the external DAA 24 or the internal DAA 112 unless extended features are accessed, which is done using new AT commands.

The Dial Command

Figure 4:
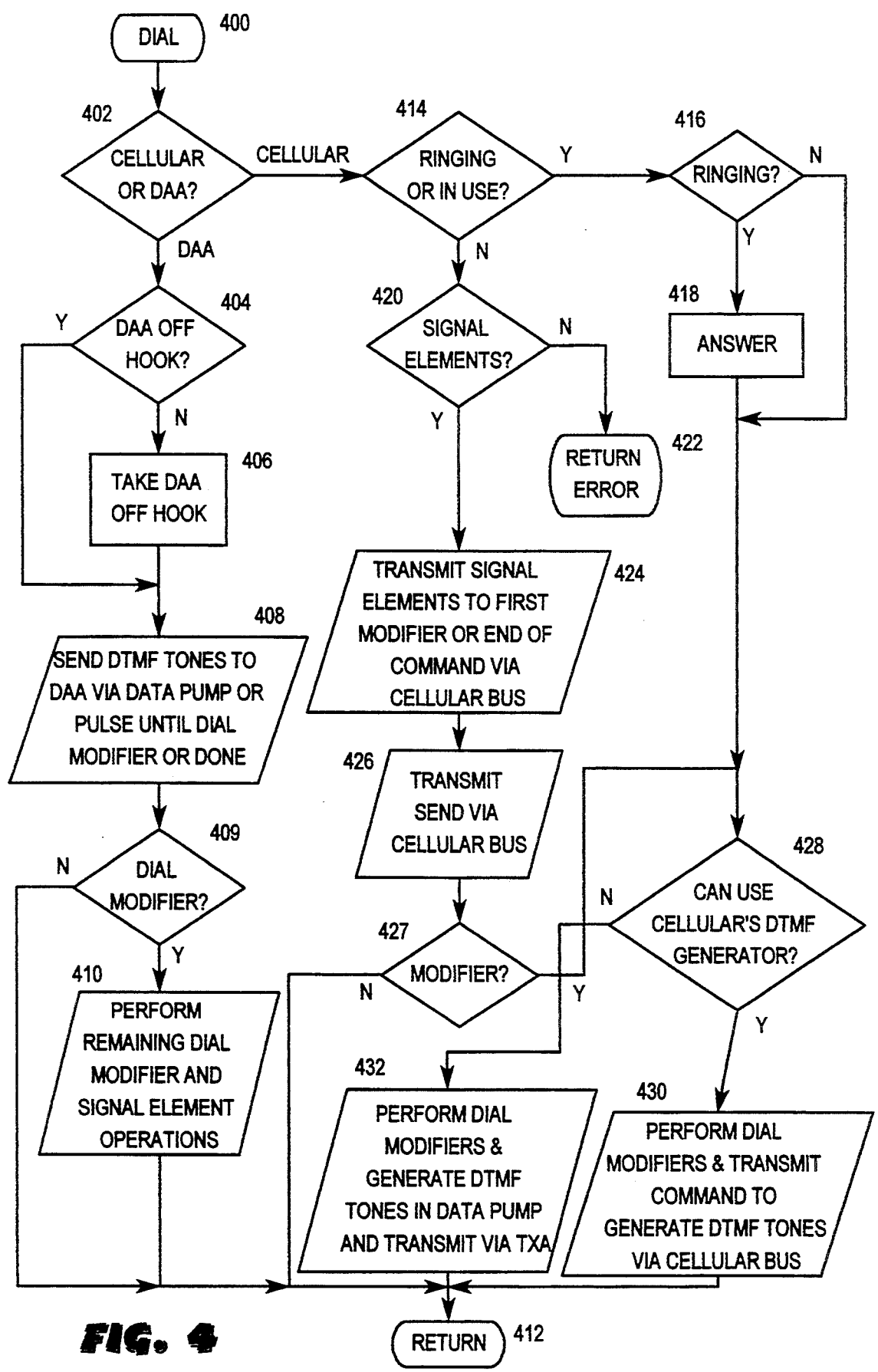
FIG. 4 shows a flowchart of operation of the dial command as executed by the modem of FIG. 2 in accordance with the methods of the invention.

FIG. 4 shows a flowchart of how the cellular primitive routines 308 implement the tone dial command, which under the AT command set is defined as ATDTn, where n is the number to be dialed. The dial command in the land line primitive routines, illustrated by the external DAA primitive routines 304 and the internal DAA primitive routines 306, simply sends out the appropriate tones matching the numbers to be dialed. In the cellular model, however, the modem 12 must first send the number to be dialed over the cellular communications bus to the cellular phone 22 through the cellular/external DAA interface 114, and then transmit a SEND directive over the same cellular communications bus.

In using the ATDT command, the characters following the ATDT command are divided into signaling elements and dial modifiers. Signaling elements include the normal key pad numbers 0 through 9 (and A through D, *, and # when using tone dialing), while delaying dial modifiers include @, W and comma (,), which indicate wait for silence, wait for dial tone and pause, respectively. In the cellular model, the signaling elements up to the first delaying dial modifier must be sent as commands over the cellular communication bus. After the first delaying dial modifier, a SEND command must be sent to the cellular phone 22 via the cellular communications bus to instruct the cellular phone 22 to dial that number. Then, the remaining signaling elements are transmitted via DTMF tones, either by sending commands to the cellular phone via the cellular communications bus instructing the cellular phone to generate those tones and transmit them, or by generating those tones and the data pump 104. Illustrative of this would be if one wished to dial into a bulletin board network and dial one's sign-on message. To accomplish this, the laptop computer 10 would send an AT command, for example, to the modem 12 as follows: "ATDT765-4321,,,121212,, 3434", where "765-4321" is the telephone of the bulletin board network, ",,," indicates three pause periods to allow a connection to be established and "12122,,3434" is the sign on sequence with several embedded pauses to allow time between an ID and a password. The modem 12 first instructs the cellular phone 22 to dial the telephone number "765-4321" by transmitting those digits over the cellular communications bus and then sending a SEND command over that bus. Operation then pauses for the requested period. Then, the appropriate DTMF codes are sent for the sign-on sequence, with pauses in the middle as indicated. This is all accomplished by the routine illustrated by the flow chart in FIG. 4.

The DIAL routine 400 is called when a D command is received and begins at step 402 by determining whether communications are being commenced via the cellular phone 22 or a DAA (either the internal DAA 112 or the external DAA 24). If communications are to be accomplished through a DAA, the routine proceeds to step 404, where it is determined whether the DAA currently has the line off hook. If not, the modem 12 takes the DAA off hook at step 406. Otherwise, the routine proceeds to step 408, where the DTMF tones representing the dial string are sent to the DAA by generation in the data pump 104 and transmission on the TXA line. Alternatively, pulses are provided if pulse mode is active. Tones or pulses are provided until a delaying dial modifier is received or the sequence is completed. In step 409 a determination is made whether a delaying dial modifier was the cause of exiting step 408. If so, control proceeds to step 410 where the remaining delaying dial modifier and signal element operations are performed according to conventional operations. After step 410 or if done in step 408, control proceeds to step 412 to indicate completion of the dial command. The communications link establishment and negotiations would be occurring in parallel with step 410 and if unsuccessful would interrupt operations and cause a premature termination of the dial sequence 400.

If a cellular phone connection is being attempted through the cellular/external DAA interface 114 and the RJ45 type jack 16, however, the routine proceeds to step 414. At step 414, the routine determines, through communications between the microprocessor 102 and the cellular phone 22 over the cellular communications bus, whether the cellular phone 22 is either ringing or currently in use. If in use, then the cellular phone 22 is "off hook," so the routine proceeds to step 416 where it determines whether the cellular phone 22 is ringing. If the cellular phone 22 is ringing, the modem 12 sends commands to the cellular phone 22 at step 418. It accomplishes this by sending a command via the cellular communications bus. After answering or if the phone 22 is not ringing, control proceeds to step 428.

If the phone 22 is not ringing or in use, however, the routine proceeds to step 420, where if there are no signaling elements after the D command, the routine returns an ERROR at step 422. This is done because an D command without signaling elements when a cellular phone is not ringing or in use is inappropriate.

If there are signaling elements, however, the routine proceeds to step 424, where the microcontroller 102 transmits all of the signaling elements up to the first delaying dial modifier or the end of the command, whichever comes first, via the cellular communications bus to the cellular phone 22. Then, at step 426, the microcontroller 102 transmits a SEND command to the cellular phone 22 via the cellular communications bus to place the call. Control proceeds to step 427 to determine if a delaying dial modifier caused the exit from step 426. If not, control proceeds to step 412. If so, control proceeds to step 428.

At step 428, the modem 12 prepares to send any remaining signaling elements, with appropriate pauses, by using DTMF tones, as pulses are not supported. If the DTMF generator in the cellular phone 22 can be used, the routine proceeds to 430, where the microcontroller 102 performs any dial modification operations and transmits signal elements over the cellular communications bus instructing the cellular phone 22 to transmit DTMF tones as specified by the D command. If, however, the cellular phone 22 cannot be instructed to generate its own DTMF tones, the routine proceeds to step 432, where the microcontroller 102 performs any dial modification operations and instructs the data pump 104 to generate DTMF tones for any signal elements, which are then transmitted over the TXA signal line. Then the routine proceeds to steps 412.

Thus special strings are not needed to dial over the cellular phone 22. The same dial sequence as used with the land line is performed in the analogous manner. This greatly simplifies development of applications programs, indeed generally allowing the use of standard programs.

Cellular Primitives for other AT Commands

Other standard AT commands, while understandable in the land line model, require reinterpretation in the cellular model. For example, in the land line model, the "ATH1" command directs a modem to pick up the phone, referred to as going off hook. This has no useful analogy in the cellular model unless the cellular phone is already ringing. Thus, the command has no effect if the cellular phone is not ringing. If the cellular phone is ringing, the ATH1 command "answers" to the phone. Later, the user might issue a "ATA" or "ATD" command to actually initiate the data link connection. If the cellular phone is already in use, the "ATH1" command causes the modem to acquire control of the phone.

The "ATH0" command has a close analogy. In the land line environment this indicates hang up or go on hook. In the cellular model this command is interpreted as requesting the cellular phone 22 to transmit an END command.

In the land line model, the "ATA" command causes the modem to seize the line and start an answer sequence. This command presumes the phone is ringing or that the line will otherwise have an originating modem connected to the other end. In the cellular environment, this command returns an ERROR code of the phone is not ringing or if there is no call currently in place. If the phone is ringing or a call is in place, the "ATA" command operates as in the land line model, that is, by answering and then starting an answer sequence.

These additional interpretations for the cellular environment complete the transformations necessary to allow complete, transparent operation of a modem over a cellular phone while using land line commands and not specific cellular phone command strings. This transparency greatly increases the number of applications programs useable with a cellular phone and modem link.

Cellular Specific AT Commands

There are certain features that are unique to the cellular interface model, and to that end it is advantageous to add AT commands to access those specific features. These commands would be implemented as vendor cellular primitive routines 316 and 318, and are available for those vendor's phones that support the features, and return either an ERROR or UNSUPPORTED response for those vendors' phones that do not. In the preferred embodiment, they are implemented as AT$_ commands, although they could be otherwise implemented and use mnemonics other than the ones presented here.

The "AT$Tn" command is used to request cellular call timer values. If n is 0, the time of the current or last call is returned. If n is 1, the cumulative in use time is returned. When this command is received, the microcontroller 102 causes the proper signals to be transmitted to the cellular phone 22 using the switched data lines to request this information from the cellular phone 22. The cellular phone 22 returns the information, which in turn is returned by the microcontroller 102 to the computer 10.

The "AT$En" command is used to enable or disable the keypad in the cellular phone 22. If n is 0, the keypad is disabled, while an n value of 1 enables the keypad. When this command is received, the microcontroller 102 causes the proper signals to be transmitted to the cellular phone 22 to enable or disable the keypad.

The "AT$I" command is used to report cellular telephone information. The command returns the manufacturer and model of the cellular telephone, up to two assigned NAMs and any forwarding number. If no cellular telephone is connected, the command responds with a NO PHONE result code.

The "AT$Ln" command locks the cellular telephone. It uses an optional number to activate the lock function of the cellular phone 22. The command responds with the ERROR result code if the action is not successful.

The "AT$Un" command unlocks the cellular telephone. It uses a multiple digit number to activate unlock function of the cellular telephone, and responds with the ERROR result code if the action is not successful.

The "AT$Nn" command sets the cellular NAM. It causes NAM 1 or NAM 2 to be selected in cellular telephone that support dual NAM (dual phone service) features. A value of 0 indicates no change, while values of 1 and 2 select NAM 1 and NAM 2, respectively.

The "AT$Rnnnnn" command resets the cellular timers. This command resets the cellular phone call timer and cumulative times to 0. It requires a five digit security pass code string.

The "AT$Znn=s" command and the "$S=nn" dial modifier perform similarly to the standard "AT&Zn=S" command and the "S=n" dial modifier. But while "AT&Zn=S" and "ATDS=n" store and dial a dial string s in location n in the modem 12, "AT$Znn=s" and "ATD$S=nn" store and dial a dial string s in location nn in the cellular phone 22. If the cellular phone 22 is connected, the "AT$Znn=s" command directs the cellular phone 22 to store the dial string s in the internal location nn of the cellular phone 22, if that feature is available. Similarly, the "AT$Znn?" command causes the modem 12 to retrieve the dial string stored in location nn of the cellular phone 22 and also causes the cellular phone 22 to display it on its display. The "ATD$Snn" command causes the cellular phone 22 to dial the dial string stored in location nn. As with the land line versions of the command, if no nn value is provided, location 0 is used. Further, the "AT$Z" command must be the last command on the command line, and the "$S" dial modifier can only be at the end of the dial string. If the string s is left blank, the location nn is cleared. The commands respond with the NO PHONE result code if no cellular telephone is present.

The implementation of each of these commands is cellular telephone specific and requires communication over the cellular communications bus with the cellular telephone 22.

Other commands that can be implemented in the modem 12 include directly displaying a string on the display of the cellular telephone 22, if the cellular telephone has a display. This string could include call and connection status information, which would normally be provided by an applications program on the computer display.

A number of S registers are also provided in the modem 12 for specific use with the cellular phone 22. To prevent conflicts with the existing AT standard, these are implemented as "$S" registers. In the preferred embodiment, the "$S0" register contains status bits indicating whether call forwarding is in effect, whether the cellular phone 22 is in use, whether the cellular phone 22 is locked, whether service is available, whether the cellular phone 22 is roaming, the system type, and whether the cellular phone 22 is available.

The "$S1" register is a read only register indicating the received signal strength from the cellular phone 22. The associated "$S2" register specifies a threshold strength for dialing and answering calls. If the cellular signal strength as indicated in "$S1" is below this level, ATD and ATA commands are terminated with the NO CARRIER result code and no connection will be made. This determination is made before entering the DIAL sequence 400.

The "$S3" register selects the appropriate cellular system to be utilized by the cellular phone 22. It allows the user to elect the user's home system, system A, system B, both systems, or system B followed by system A.

The "$S4" register specifies the cellular phone 22 automatic shutoff time in minutes. It allows the user to program the cellular telephone 22 to turn off automatically after the specified length of time. Setting this register to zero results in no change. Setting this register to 255 causes the cellular telephone's automatic shutoff time feature to be disabled.

The "$S5" register sets the cellular ear piece volume, the "$S6" register sets the cellular ringer volume, and the $S7 register since their cellular speaker volume. Finally, the "$S8" register returns the battery level of the cellular phone.

Again, all of these features are implementation specific to each vendor's cellular phone 22. The microcontroller 102 performs the vendor cellular primitive routines 316 or 318, which instruct the microcontroller 102 how to implement all of these routines for a particular cellular telephone. The microcontroller 102 then, through the cellular communications bus, commands the cellular phone to perform the associated actions, or inquiries into certain status of the cellular phone.

Application Level Use of the Cellular Commands

Further cellular specific features can be implemented in the laptop computer 10 application software itself. These can take advantage of certain features of the cellular telephone 22 that are not present in just the land line model, and could reduce costs and communications problems that are unique to cellular telephones.

Figure 5:
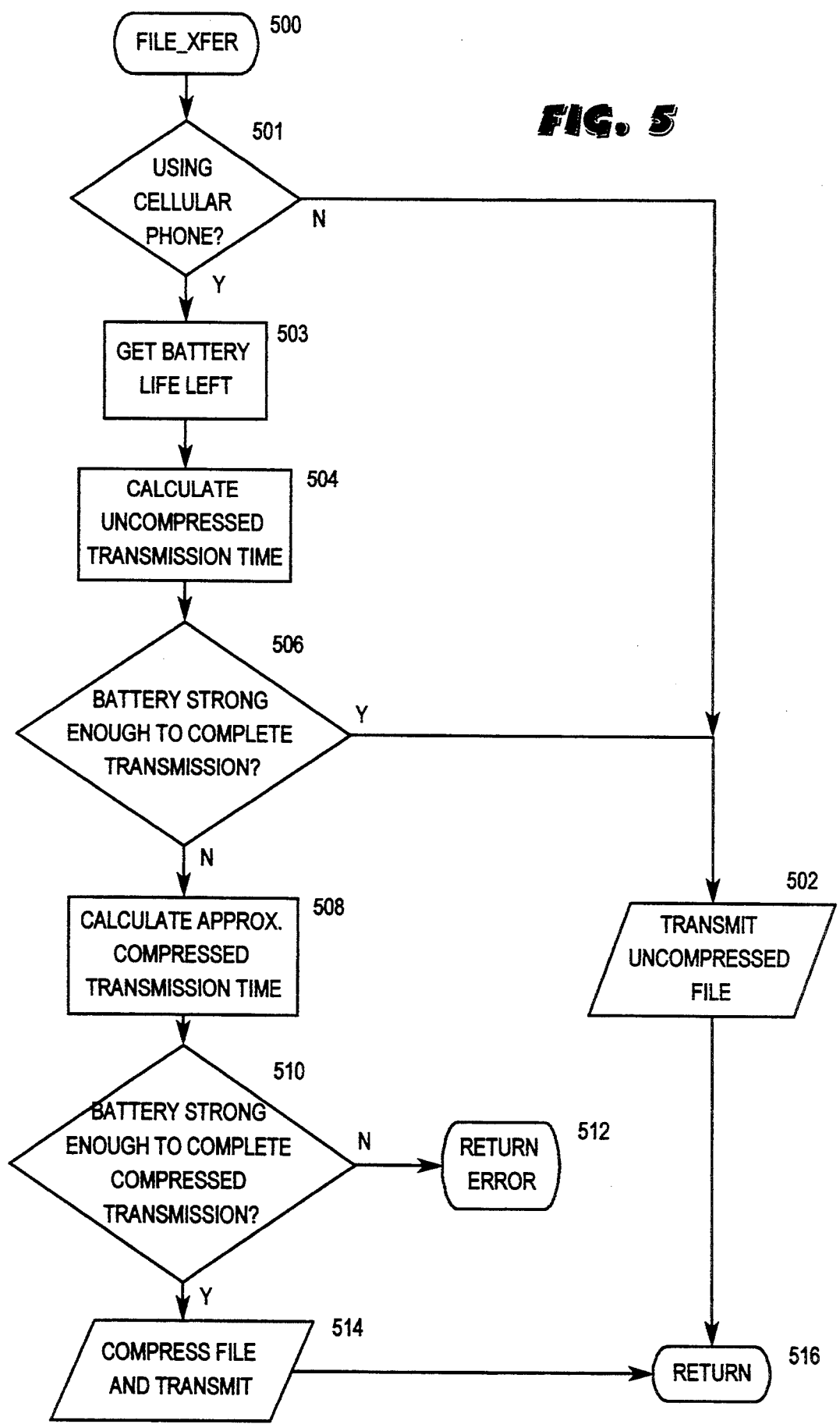
FIG. 5 shows a file transfer sequence as executed by the computer and modem of FIGS. 1A-1D according to the methods of the invention.

As a first example, the cellular telephone 22 has a limited connect time because of its battery strength. If one initiates a long file transfer, it would be unfortunate for half of that transfer to be accomplished and then for the cellular telephone 22 battery to fail. Thus, FIG. 5 shows a file transfer routine FILE_XFER 500 that alleviates this problem. At step 501, the laptop computer 10 determines if the modem 12 is connected with the cellular phone 22. It can do this by one of the AT commands previously discussed, such as the AT$I command. If not, the routine proceeds to step 502, where the laptop computer 10 transmits the file normally.

Otherwise, at step 503, the application software in the laptop computer 10 determines the strength of the cellular battery. This is accomplished by performing one of the AT commands previously mentioned. Specifically, in the preferred embodiment, the $S8 register in the modem 12 contains the battery level of the cellular phone. Thus, the laptop computer 10 would send AT$S8. Then, based upon the laptop computer 10's knowledge of the particular cellular phone connected, it can determine the approximate amount of time remaining available for communication over the cellular phone 22. At step 504, the laptop computer 10 calculates the uncompressed transmission time for the file by taking into account the bits per second rate at which the modem 12 is communicating and the length of the file. If, at step 506, the cellular battery is strong enough for the entire file to be transferred without the battery dying, then the route proceeds to step 502, where the entire file is transmitted. Otherwise, the routine proceeds to step 508. There, the laptop computer 10 calculates the approximate compressed transmission time for the file to be transferred. This is done by approximating a compression ratio through routines well known in the art and using this in conjunction with the bits per second rate at which the modem 12 is communicating. Then, at step 510, the laptop computer 10 compares the amount of time available to complete the transfer based upon the battery strength with the amount of time it will take to transfer the file if it were compressed. If there is still not enough time for the cellular telephone to complete the file transfer, the routine proceeds to step 512, where an ERROR is returned to the user, preferably one indicating that the file is not being transferred because of lack of remaining battery life in the cellular phone 22.

Otherwise, the routine proceeds to step 514, where the file is compressed and transmitted via the cellular link. Then, a return is executed at step 516.

Figure 6:
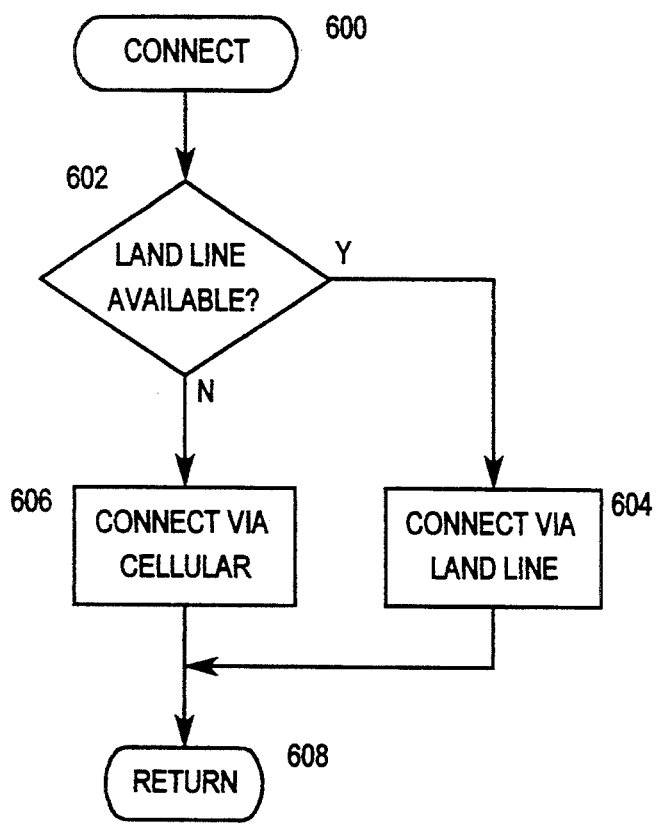
FIG. 6 shows a cellular versus land line selection sequence as executed by the computer and modem of FIGS. 1A-1D according to the methods of the invention.

FIG. 6 shows a high level application routine for determining whether to make a connection using the cellular phone 22 or a land line. This connect routine 600 begins at step 602, where it queries the modem 12 as to whether the land line is available. This would be accomplished by an AT command, such as attempting to establish a connection. If the land line is available, the routine proceeds to step 604, where the land line connection is made. If the land line is not available, the connection is instead made through the cellular phone 22 at step 606. Then a return is executed at step 608. This routine assumes that the default of cellular phone link first has been overridden by a specific user command.

This connect routine 600 would be useful in a variety of situations, such as where the modem 12 is installed in a desktop computer and left unattended. It may be desired to automatically transfer files at a particular time of the day. As cellular connections are generally more expensive, the routine would first attempt to make the connection through the land line, but would fall back to the cellular phone 22. This would provide a greater degree of redundancy in unattended file transfers, and would be useful not only for the laptop computer 10, but also, for example, for point of sale systems that need to make transfers after hours. Alternatively, this would also allow a message of great urgency to be transmitted, if at all possible. For example, the modem 12 may be located in a file server which attempts to page or communicate with a network administrator when certain errors occur. As the failure of the file server is often critical, this communication is of very high priority and should be transmitted if at all possible.

Figure 7:
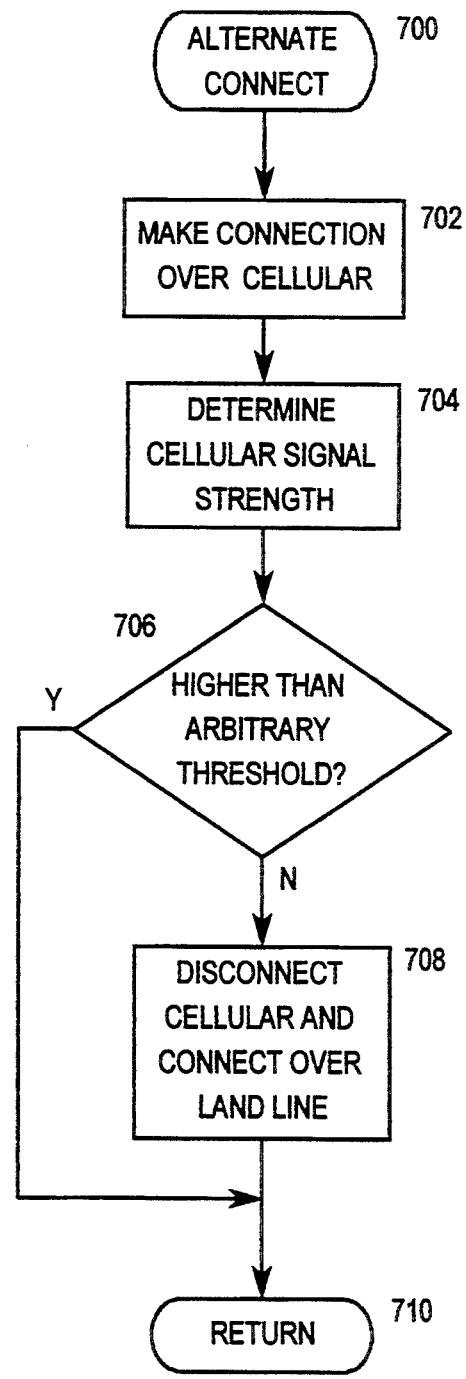
FIG. 7 shows a flowchart of an alternative connect sequence for selecting between the land line and cellular telephone based upon the available signal strength of the cellular telephone.

FIG. 7 shows an alternate connection routine 700 that could be implemented in the laptop computer 10 and used to select between using the cellular phone 22 and a land line based upon the signal strength of the cellular phone 22. At step 702, the laptop computer 10 instructs the modem 12 to make a connection over the cellular phone. This can be done by setting the previously mentioned $S3 register, which allows the selection of the cellular system as opposed to the land line system. Then, a connection could be established using the ATDT command.

Once the connection is established, the routine proceeds to step 704, where it determines the cellular signal strength. This can be done by querying the $S1 register using the AT$S1 command from the laptop computer 10 to the modem 12. At step 706, if the signal strength is not higher than an arbitrary threshold selected by the laptop computer 10 which is higher than the value contained in the $S3 register or the connection would not have been established, the routine proceeds to step 708, where the cellular connection is disconnected and a connection is attempted over the land line. In either case, the routine then returns to step 710, with a connection established either over the land line or the cellular phone 22.

This routine would be useful in a situation where one, for example, wished to avoid toll charges for connecting to a land line or where long files are to be transmitted and repeated transmission of packets or blocks or possibly the entire file is not desired if errors occur.

The foregoing disclosure and description of the invention are illustrative and explanatory thereof, and various changes in the flow of the algorithms and construction of the devices may be made without departing from the spirit of the invention.

We claim:

1. A modem for connection with a cellular phone and a host computer, the host computer for providing commands according to the conventional land line AT command set to the modem, the modem comprising:

a host computer communications port for connection with the host computer for receiving commands from the host computer;

a cellular phone communications port for connection with the cellular phone for allowing transfer of data and commands; and means connected to said host computer and said cellular phone communication ports for receiving commands, including land line AT dial commands, from the host computer and providing commands to the cellular phone, said means for receiving converting received commands that are land line AT dial commands to appropriate cellular phone commands and transmitting said appropriate cellular phone commands to the cellular phone after conversion of said land line AT dial commands, wherein said means for receiving converts received land line AT dial commands by transmitting signal elements to the cellular phone until a delaying dial modifier is received, then transmitting a SEND command, and then performing the operation corresponding to the received delaying dial modifier.

2. The modem of claim 1, wherein said means for receiving further converts an AT answer command of the AT command set to an ERROR response if the cellular phone is not active or receiving a call, enters answer mode if the cellular phone is active and causes the cellular phone to answer if a call is being received and then enters answer mode.

3. The modem of claim 1, wherein said means for receiving further converts an ATH0 command of the AT command set to a cellular phone END command and an ATH1 command to an ERROR response if the cellular phone is not active or receiving a call, causes the cellular phone to answer the call if receiving a call and acquires control of the cellular phone if the cellular phone is active.

4. The modem of claim 1, wherein said means for receiving further determines if the cellular phone is capable of generating dual-tone multi-frequency tones and if so, causes the cellular phone to emit the appropriate tone for each signal element received after transmitting said SEND command, and if not, develops dual-tone multi-frequency tones appropriate for each signal element received after transmitting said SEND command and provides said tones to the cellular phone.

5. The modem of claim 1, wherein said means for receiving further receives a command for inquiring into a connected cellular phone's status, performs said inquiry of the cellular phone and returns status information.

6. The modem of claim 1, wherein said means for receiving further receives commands to enable and disable a connected cellular phone's keypad and provides commands to enable and disable the cellular phone keypad to the cellular phone.

7. The modem of claim 1, wherein said means for receiving further receives commands to lock and unlock the cellular phone and provides commands to lock and unlock the cellular phone to the cellular phone.

8. The modem of claim 1, wherein said means for receiving further receives commands to read the cellular phone information of the cellular phone, provides commands to obtain the information from the cellular phone and returns said information.

9. The modem of claim 1, wherein said means for receiving further receives commands to inquire into the time used by the cellular phone and to reset cellular timers in the cellular phone, provides commands to the cellular phone to determine the time used and to reset the time and returns the time used.

10. The modem of claim 1, wherein said means for receiving further receives commands to store phone numbers in the cellular phone and to retrieve said phone numbers in the cellular phone, provides commands to the cellular phone to store a phone number and retrieve a phone number and returns a retrieved phone number.

11. The modem of claim 1, wherein said means for receiving further receives a command to direct the cellular phone to display data on a display of the cellular phone and provides a command to the cellular phone to display selected data.

12. The modem of claim 1, wherein said means for receiving further receives a command to determine the strength of a battery in the cellular phone, provides a command to the cellular phone to determine remaining battery strength and returns said determined battery strength.

13. The modem of claim 1, wherein said means for receiving further receives a command to determine the cellular phone's signal strength, provides a command to the cellular phone to determine signal strength and returns said determined signal strength.

14. The modem of claim 1, wherein said means for receiving further receives a command to set an automatic shutoff time and of the cellular phone provides a command to the cellular phone to set the cellular phone automatic shutoff time.

15. The modem of claim 1, wherein said means for receiving further receives commands to set a volume of a speaker in the cellular phone and to set a volume of a ringer in the cellular phone and provides commands to the cellular phone to set the speaker and ringer volumes of the cellular phone.

16. A method for utilizing the conventional land line AT command set with a cellular phone, in a modem for connection with a cellular phone and a host computer, the host computer for providing commands according to the conventional land line AT command set, including land line AT dial commands, to the modem, the modem having a host computer communications port for connection with the host computer for receiving commands from the host computer and a cellular phone communications port for connection with the cellular phone for allowing transfer of data and commands, the method comprising the steps of:

receiving commands from the host computer;

converting received land line AT dial commands to appropriate cellular phone commands; and transmitting said appropriate cellular phone commands to the cellular phone after conversion of said land line AT dial commands, wherein said step of converting received land line AT dial command includes transmitting signal elements to the cellular phone until a delaying dial modifier is received, then transmitting a SEND command, and then performing the operation corresponding to the delaying dial modifier.

17. The method of claim 16, wherein further comprising the steps of:

converting the AT answer command to an ERROR response if the cellular phone is not active or receiving a call;

entering answer mode if the cellular phone is active; and causing the cellular phone to answer if a call is being received and then entering answer mode.

18. The method of claim 16, further comprising the steps of:

converting the ATH0 command to cellular phone END command;

converting the ATH1 command to an ERROR response if the cellular phone is not active or receiving a call;

causing the cellular phone to answer the call if receiving a call; and acquiring control of the cellular phone if the cellular phone is active.

19. The method of claim 16, wherein said step of converting further includes determining if the cellular phone is capable of generating DTMF tones and if so, causing the cellular phone to emit the appropriate tone for each signal element received after transmitting said SEND command, and if not, developing DTMF tones appropriate for each signal element received after transmitting said SEND command and providing said tones to the cellular phone.

* * * * *

UNITED STATES PATENT AND TRADEMARK OFFICE
CERTIFICATE OF CORRECTION

PATENT NO. : 5,428,671
DATED : June 27, 1995
INVENTOR(S) : Don A. Dykes et al.

It is certified that error appears in the above-identified patent and that said Letters Patent is hereby corrected as shown below:

In col. 18, line 25, please delete "and".

In col. 18, line 25, after "phone" insert --and--.

Signed and Sealed this

Twenty-eighth Day of November 1995

Attest:

BRUCE LEHMAN

Attesting Officer

Commissioner of Patents and Trademarks